US010030363B2

(12) United States Patent
Imura et al.

(10) Patent No.: US 10,030,363 B2
(45) Date of Patent: Jul. 24, 2018

(54) HYBRID WORK MACHINE

(71) Applicant: HITACHI CONSTRUCTION MACHINERY CO., LTD., Tokyo (JP)

(72) Inventors: Shinya Imura, Toride (JP); Shinji Nishikawa, Kasumigaura (JP); Masafumi Hita, Tsuchiura (JP); Hiroaki Amano, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 137 days.

(21) Appl. No.: 15/040,433

(22) Filed: Feb. 10, 2016

(65) Prior Publication Data

US 2016/0265195 A1  Sep. 15, 2016

(30) Foreign Application Priority Data

Mar. 10, 2015 (JP) .................... 2015-047745

(51) Int. Cl.
*F15B 21/14* (2006.01)
*E02F 9/22* (2006.01)
(Continued)

(52) U.S. Cl.
CPC ............ *E02F 9/2235* (2013.01); *B60K 6/485* (2013.01); *B60W 20/00* (2013.01); *E02F 9/2075* (2013.01); *E02F 9/2091* (2013.01); *E02F 9/2242* (2013.01); *E02F 9/2292* (2013.01); *E02F 9/2296* (2013.01); *F15B 11/08* (2013.01); *F15B 13/0416* (2013.01); *B60W 10/30* (2013.01);
(Continued)

(58) Field of Classification Search
CPC ....... E02F 9/207; E02F 9/2075; E02F 9/2217; E02F 9/2246
See application file for complete search history.

(56) References Cited

U.S. PATENT DOCUMENTS 7,069,674 B2 * 7/2006 Arii ................. E02F 9/2292
37/348

FOREIGN PATENT DOCUMENTS

EP   2 204 504 A1   7/2010
EP   2 672 024 A1   12/2013
(Continued)

OTHER PUBLICATIONS

Extended European Search Report received in corresponding European Application No. 16155716.0 dated Aug. 3, 2016.

*Primary Examiner* — Michael Leslie
(74) *Attorney, Agent, or Firm* — Mattingly & Malur, PC

(57) ABSTRACT

A hybrid work machine has an engine, an assist motor, a hydraulic pump which is driven by the total torque of the engine and the assist motor, and an electric storage device which accumulates electric power generated by the assist motor and supplies the electric power when the assist motor performs electric discharge. The continuous electric discharge from the electric storage device due to continuous operation at high load pressure can be suppressed without an operator experiencing an unusual operational characteristic. To this end, a pump flow rate correction control unit judges whether each hydraulic pump is in a high load operation state or not based on the output horsepower and/or the delivery pressure of each hydraulic pump and performs control such that the delivery flow rate gradually decreases when the hydraulic pump is in the high load operation state and this state continues beyond a predetermined time.

3 Claims, 16 Drawing Sheets

(51) Int. Cl.
*E02F 9/20* (2006.01)
*B60K 6/485* (2007.10)
*B60W 20/00* (2016.01)
*F15B 11/08* (2006.01)
*F15B 13/04* (2006.01)
*B60W 10/30* (2006.01)
*E02F 3/32* (2006.01)

(52) U.S. Cl.
CPC ...... *B60W 2300/17* (2013.01); *B60Y 2200/92* (2013.01); *E02F 3/32* (2013.01); *E02F 9/2217* (2013.01); *E02F 9/2285* (2013.01); *F15B 2211/20515* (2013.01); *F15B 2211/20523* (2013.01); *F15B 2211/255* (2013.01); *F15B 2211/2656* (2013.01); *Y10S 903/903* (2013.01)

(56) References Cited

FOREIGN PATENT DOCUMENTS

| | | |
|---|---|---|
| EP | 2 677 146 A1 | 12/2013 |
| JP | 2012-172521 A | 9/2012 |

\* cited by examiner

HYBRID WORK MACHINE

BACKGROUND OF THE INVENTION

1. Field of the Invention

The present invention relates to a hybrid work machine including an engine, an assist motor, a hydraulic pump which is driven by total torque of the engine and the assist motor, and an electric storage device which accumulates electric power generated by the assist motor and supplies the electric power when the assist motor performs electric discharge.

2. Description of the Related Art

In recent years, in automobiles, the hybrid type and the electric type are becoming prevalent in terms of energy saving, and the hybridization is being promoted also in work machines such as construction machines. In general, a work machine such as a hydraulic excavator driven by a hydraulic system includes a hydraulic pump which enables work at the maximum load and a large-sized engine which drives the hydraulic pump, so that the work machine can deal with every type of work from low load work to heavy load work.

However, the heavy load work, such as heavy excavation work in which the hydraulic excavator frequently performs excavation and loading of earth and sand, is only a part of the entire work, and the high ability of the large-sized engine becomes surplus at times of the light load work such as the leveling for smoothing the ground surface. This is one factor that impedes the reduction of the fuel consumption of hydraulic excavators. In consideration of this point, a hybrid work machine, in which the engine is downsized for the reduction of the fuel consumption and insufficient output power due to the downsizing of the engine is supplemented (assisted) by output power produced by an electric storage device and an assist motor (electric motor) as described in JP-2012-172521-A, for example, have been proposed and have become widely known.

Further, in the technology of JP-2012-172521-A, a characteristic in regard to the setting of pump maximum input power is switched to one of first and second two characteristics depending on whether the hydraulic pump is in a normal operation state in which the hydraulic pump delivers hydraulic fluid from a low pressure range to an intermediate range or in a high load pressure operation state in which the hydraulic pump continuously delivers hydraulic fluid in a high pressure range.

SUMMARY OF THE INVENTION

In the heavy load work, a hybrid work machine drives the assist motor by consuming the electric power stored in the electric storage device. In the light load work or idling, the hybrid work machine stores electric power in the electric storage device by having the assist motor perform the power generation. In cases where the light load work is performed when sufficient electric power is stored in the electric storage device, the hybrid work machine operates with the power of the engine alone, without driving the assist motor. In general, small-sized engines are low in the energy loss caused by rotational friction and also low in the fuel consumption per output power in comparison with large-sized engines. Therefore, such hybrid work machines are capable of achieving low fuel consumption.

However, in such hybrid work machines employing a small-sized engine, when the heavy load work is performed for a long time without a break, the electric power of the electric storage device is depleted and the hybrid work machine falls into a state in which the machine cannot perform the heavy load work any more. Especially in continuous operation at high load pressure such as warmup operation just after startup of the engine when the temperature is low, or rock excavation work, etc., the pump works continuously in full operation and the electric power of the electric storage device keeps on decreasing, and the possibility of the depletion of the electric power of the electric storage device increases.

To deal with this problem, the hybrid work machine described in JP-2012-172521-A is configured to switch the characteristic in regard to the setting of the pump maximum input power to one of first and second two characteristics depending on whether the hydraulic pump is in the normal operation state in which the delivery pressure of the hydraulic pump is in the low pressure range or the intermediate range or in the high load pressure continuous operation state in which the hydraulic pump is continuously operated in the high pressure range.

In such a method switching the pump characteristic, however, an unusual operational feeling for the operator tends to occur at times of the switching.

The object of the present invention, which has been made in consideration of the above-described situation, is to provide a hybrid work machine including an engine, an assist motor, a hydraulic pump which is driven by total torque of the engine and the assist motor, and an electric storage device which accumulates electric power generated by the assist motor and supplies the electric power when the assist motor performs electric discharge, in which the continuous electric discharge from the electric storage device due to continuous operation at high load pressure can be suppressed without causing an unusual operational feeling for the operator.

To achieve the above object, the present invention provides a hybrid work machine comprising: an engine; an assist motor that is mechanically connected to the engine, performs electric discharge by generating a drive torque and generates electric power by generating a braking torque; at least one hydraulic pump driven by a total torque of the engine and the assist motor; a plurality of actuators driven by hydraulic fluid delivered from the hydraulic pump; an electric storage device that accumulates the electric power generated by the assist motor and supplies the electric power when the assist motor performs electric discharge; and a pump flow rate control device that performs limiting control for a maximum delivery flow rate of the hydraulic pump such that an output horsepower of the hydraulic pump does not exceed a predetermined pump output power reference value, and performs control such that the delivery flow rate of the hydraulic pump gradually decreases when the hydraulic pump remains in a predetermined high load operation state and the high load operation state continues beyond a predetermined time.

By providing the hybrid work machine with the above-described pump flow rate control device to perform the control such that the delivery flow rate of the hydraulic pump gradually decreases when the hydraulic pump remains in a predetermined high load operation state and the high load operation state continues beyond a predetermined time, the continuous electric discharge from the electric storage device due to continuous operation at high load pressure can be suppressed without causing an unusual operational feeling for the operator.

According to the present invention, the continuous electric discharge from the electric storage device due to continuous operation at high load pressure can be suppressed without causing an unusual operational feeling for the operator.

DESCRIPTION OF THE PREFERRED EMBODIMENTS

Embodiments of the present invention will be described below with reference to figures by taking a hydraulic excavator as an example of the work machine. It should be noted that the present invention is generally applicable to any type of hybrid work machine including an electric storage device and the application of the present invention is not restricted to hydraulic excavators.

First Embodiment

Figure 1:
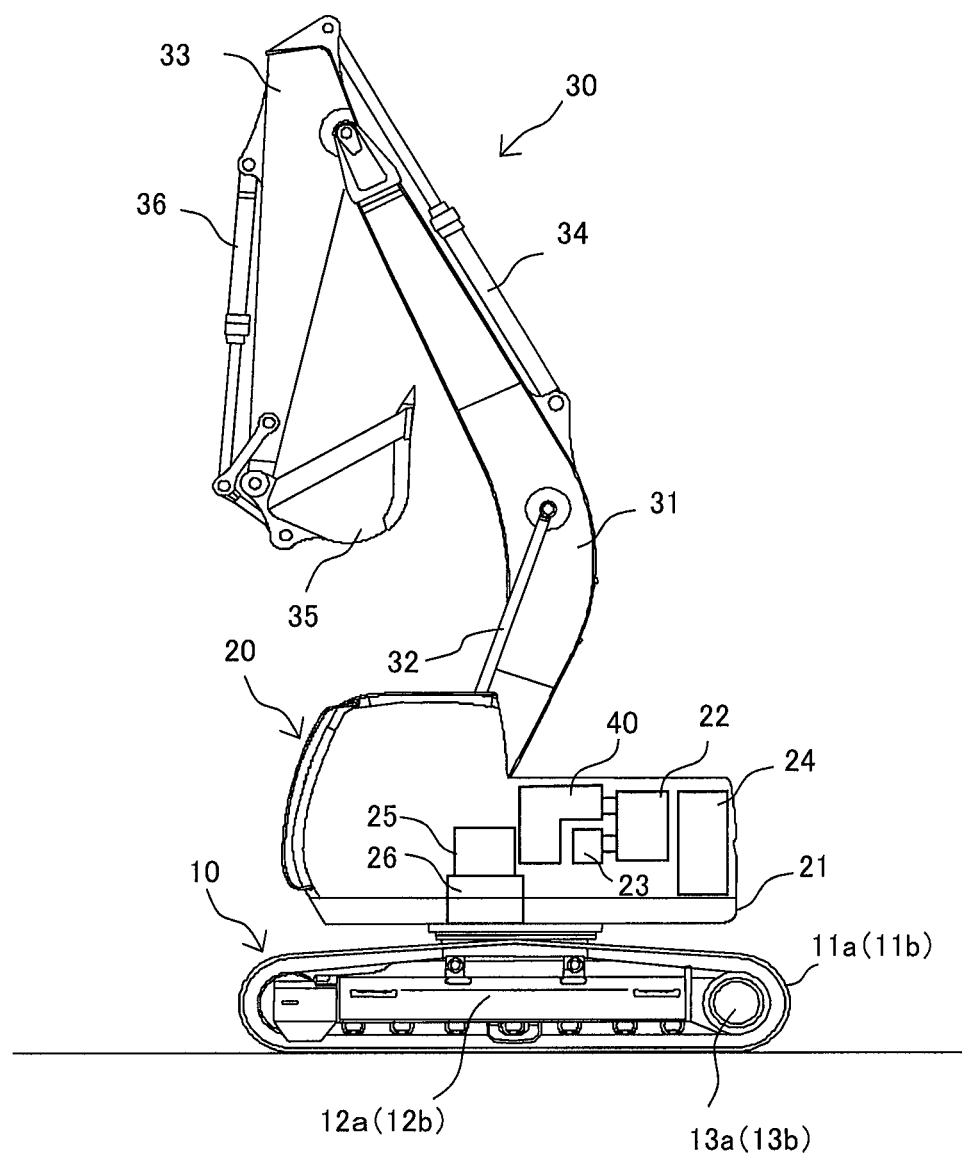
FIG. 1 is a side view of a hydraulic excavator in a first embodiment of a hybrid work machine according to the present invention.

FIG. 1 is a side view of a hydraulic excavator in a first embodiment of the hybrid work machine according to the present invention.

In FIG. 1, the hydraulic excavator includes a lower track structure 10, an upper swing structure 20 mounted on the lower track structure 10 to be swingable, and an excavation device 30 attached to the upper swing structure 20.

The lower track structure 10 includes a pair of crawlers 11a and 11b (only one side is shown in FIG. 1), a pair of crawler frames 12a and 12b (only one side is shown in FIG. 1), a pair of travel hydraulic motors 13a and 13b for independently driving and controlling the crawlers 11a and 11b, respectively, deceleration devices for the travel hydraulic motors 13a and 13b, and so forth.

The upper swing structure 20 includes a swing frame 21, an engine 22 as a prime mover mounted on the swing frame 21, an assist motor 23 driven by the engine 22, a swing electric motor 25, an electric storage device 24 connected to the assist motor 23 and the swing electric motor 25, a deceleration device 26 for decelerating the rotation of the swing electric motor 25, and so forth. The drive force of the swing electric motor 25 is transmitted via the deceleration device 26. By the drive force, the upper swing structure 20 (swing frame 21) is driven and rotated with respect to the lower track structure 10.

The upper swing structure 20 is equipped with the excavation device (front work implement) 30. The excavation device 30 includes a boom 31, a boom cylinder 32 for driving the boom 31, an arm 33 supported by a shaft in the vicinity of the tip end of the boom 31 to be rotatable, an arm cylinder 34 for driving the arm 33, a bucket 35 supported by a shaft in the vicinity of the tip end of the arm 33 to be rotatable, a bucket cylinder 36 for driving the bucket 35, and so forth.

Further, a hydraulic system 40 for driving hydraulic actuators such as the aforementioned travel hydraulic motors 13a and 13b, boom cylinder 32, arm cylinder 34 and bucket cylinder 36 is mounted on the swing frame 21 of the upper swing structure 20.

Figure 2:
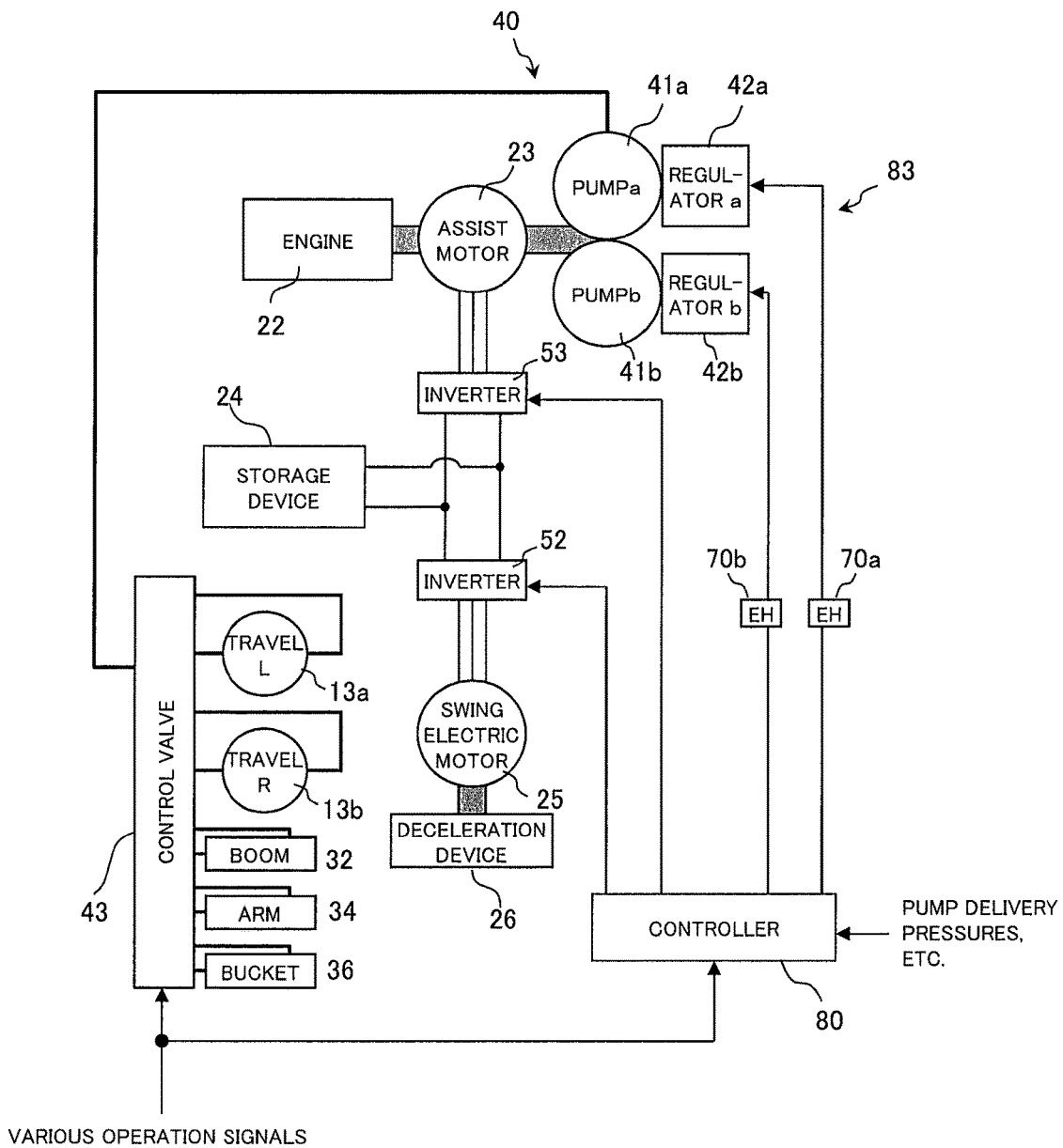
FIG. 2 is a system configuration diagram of electric/hydraulic devices of the hydraulic excavator in the first embodiment of the hybrid work machine according to the present invention.

FIG. 2 is a schematic diagram showing a system of electric/hydraulic devices of the hydraulic excavator in the first embodiment of the hybrid work machine according to the present invention.

The hydraulic system 40 includes two hydraulic pumps 41a and 41b of the variable displacement type (see FIG. 2), regulators 42a and 42b for respectively changing the tilting angles of the hydraulic pumps 41a and 41b and thereby changing their displacements, and a control valve 43 for the drive control of the actuators (see FIG. 2). Each hydraulic pump 41a, 41b is driven and rotated by the engine 22 and delivers hydraulic fluid in an amount proportional to the product of the revolution speed and the displacement.

The control valve 43 controls the flow rate and the direction of the hydraulic fluid supplied to each of the boom cylinder 32, the arm cylinder 34, the bucket cylinder 36 and the travel hydraulic motors 13a and 13b by operating various spools according to operation commands (hydraulic pilot signals) inputted from control lever devices for operations other than the swinging. Incidentally, the operation commands (hydraulic pilot signals) inputted to the control valve 43 can be interrupted by using a gate lock lever device.

When a gate lock lever is shifted to a locking state, the operation commands (hydraulic pilot signals) are interrupted. In this state, the various spools remain in their neutral states and the boom cylinder 32, the arm cylinder 34, the bucket cylinder 36 and the travel hydraulic motors 13a and 13b do not operate even if the control lever devices are moved.

An electric drive system is formed of components such as the assist motor 23, the electric storage device 24, the swing electric motor 25, an inverter 52 for driving the swing electric motor 25, and an inverter 53 for driving the assist motor 23.

DC power from the electric storage device 24 is inputted to the swing electric motor inverter 52 and the assist motor inverter 53. The swing electric motor 25 drives the upper swing structure 20 via the deceleration device 26. The electric storage device 24 is discharged when the assist motor 23 or the swing electric motor 25 is generating drive torque. The electric storage device 24 is charged when the assist motor 23 or the swing electric motor 25 is generating braking torque.

The electric storage device 24 is formed of a battery or a capacitor. When the electric storage device 24 is formed of a capacitor, the terminal voltage of the capacitor changes greatly depending on its electric amount, and thus the capacitor may be equipped with a chopper for performing voltage conversion between the capacitor and the inverters 52 and 53.

A controller 80 calculates a torque command value for the swing electric motor 25, a torque command value for the assist motor 23, and displacement command values for the hydraulic pumps 41a and 41b by using various operation command signals, a revolution speed signal of the swing electric motor 25, and so forth. The torque command for the swing electric motor 25 and the torque command for the assist motor 23 are sent to the inverters 52 and 53. According to the torque commands, the inverters 52 and 53 control the torque of the swing electric motor 25 and the torque of the assist motor 23. The displacement commands for the hydraulic pumps 41a and 41b are sent to the regulators 42a and 42b via electric/hydraulic signal conversion devices 70a and 70b. According to the displacement commands, the regulators 42a and 42b control the displacements of the hydraulic pumps 41a and 41b. The electric/hydraulic signal conversion devices 70a and 70b are devices for converting electric signals from the controller 80 into hydraulic pilot signals. The electric/hydraulic signal conversion devices 70a and 70b correspond to solenoid proportional valves, for example.

Figure 3:
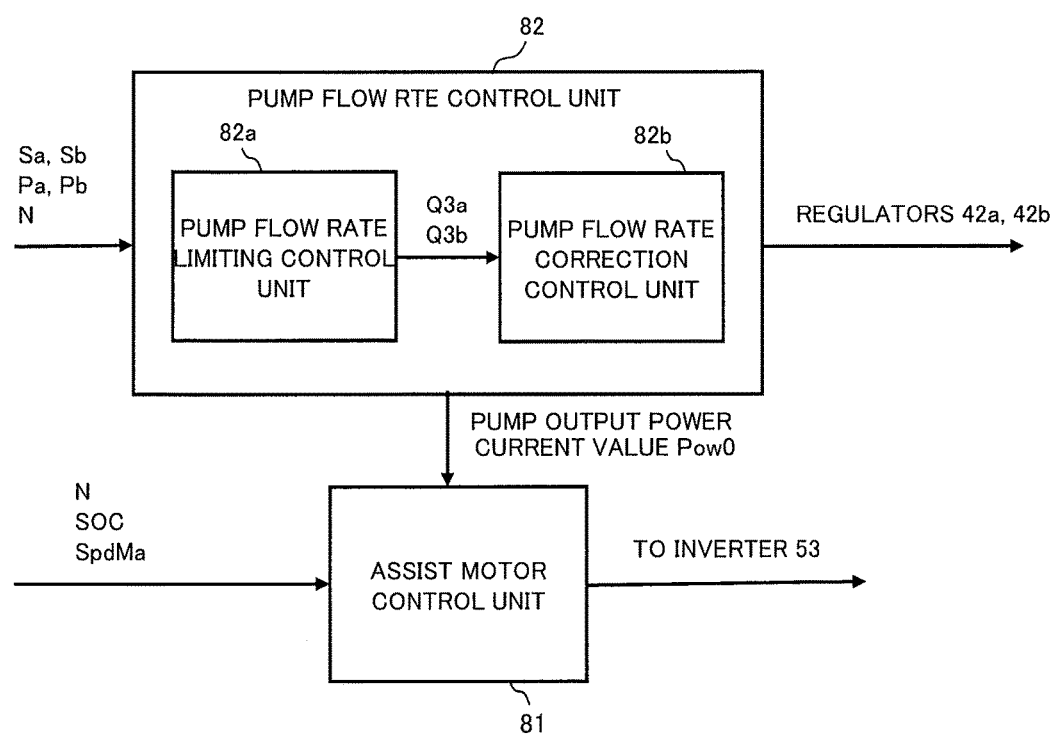
FIG. 3 is a block diagram showing control functions of a controller.

FIG. 3 is a block diagram showing the control functions of the controller 80. The controller 80 includes an assist motor control unit 81 and a pump flow rate control unit 82.

First, the assist motor control unit 81 will be explained below.

When the torque of the engine 22 is insufficient (e.g., at times of heavy load work), the assist motor control unit 81 controls the inverter 53 such that the assist motor 23 is driven by the electric power from the electric storage device 24. When the engine 22 has surplus torque (e.g., at times of light load work or idling), the assist motor control unit 81 controls the inverter 53 so as to have the assist motor 23 generate power generation torque and to store electric power in the electric storage device 24.

Figure 4:
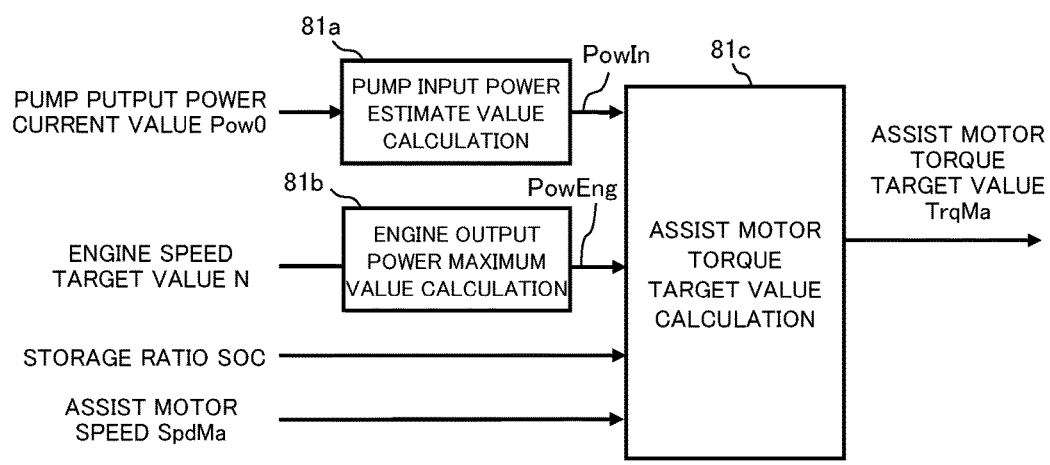
FIG. 4 is a block diagram showing a function of an assist motor control unit of the controller for calculating a torque command value.

FIG. 4 is a block diagram showing a function of the assist motor control unit 81 for calculating the torque command value.

First, a pump input power estimate value calculation unit 81a of the assist motor control unit 81 calculates a pump input power estimate value PowIn as the current input horsepower of the hydraulic pumps 41a and 41b by using a pump output power current value Pow0 (i.e., sum of the current output horsepower (absorption horsepower) of the hydraulic pump 41a and that of the hydraulic pump 41b (total output horsepower of the hydraulic pumps 41a and 41b)) and pump efficiency η according to the following expression:

PowIn=Pow0/η where the pump output power current value Pow0 is a value calculated in step S4 in FIG. 5 which will be explained later and the pump efficiency η is a preset value.

Subsequently, an engine output power maximum value calculation unit 81b of the assist motor control unit 81 calculates an engine output power maximum value PowEng from an engine speed current value or an engine speed target value N. The engine output power maximum value PowEng is determined by using a preset table similarly to a pump output power reference value Pow1 which will be explained later. Incidentally, since output power obtained by subtracting an auxiliary machinery load of an alternator, an air conditioner, etc. from the engine output power maximum value PowEng equals assigned power of the hydraulic pumps 41a and 41b, it is also possible to first calculate a pump input power reference value by dividing the pump output power reference value Pow1 by the pump efficiency and then calculate the engine output power maximum value PowEng by adding the auxiliary machinery load to the pump input power reference value.

Subsequently, an assist motor torque target value calculation unit 81c of the assist motor control unit 81 compares the pump input power estimate value PowIn with the engine output power maximum value PowEng. When the pump input power estimate value PowIn is higher than the engine output power maximum value PowEng, it is necessary to have the assist motor 23 generate drive torque (the electric storage device 24 discharges). In this case, an assist motor torque target value TrqMa (unit: Nm) is determined according to the following expression:

TrqMa=(PowIn+auxiliary machinery load−PowEng)/(2π×SpdMa/60)×1000 where SpdMa represents the assist motor revolution speed (unit: rpm).

When the pump input power estimate value PowIn is lower than the engine output power maximum value PowEng, the electric storage ratio (state of charge (SOC)) of the electric storage device 24 is compared with an electric storage ratio target value. When the electric storage ratio is lower than the target value, the assist motor 23 is made to generate braking torque (the electric storage device 24 is charged). When the electric storage ratio is higher than or equal to the target value, no torque is generated by the assist motor 23 (the torque target value is set at 0). When the assist motor 23 is made to generate braking torque, the assist motor torque target value TrqMa (braking torque is defined by a negative value) is set within the range of the following expression:

TrqMa≥(PowIn−PowEng)/(2π×SpdMa/60)×1000

The assist motor torque target value calculation unit 81c outputs the assist motor torque target value TrqMa determined as above to the inverter 53 as the torque command value for the assist motor 23 and thereby controls the torque of the assist motor 23.

Next, the pump flow rate control unit 82 will be explained below.

Together with the regulators 42a and 42b and the electric/hydraulic signal conversion devices 70a and 70b, the pump flow rate control unit 82 constitutes a pump flow rate control device 83 for controlling the delivery flow rates of the hydraulic pumps 41a and 41b. As shown in FIG. 3, the pump flow rate control unit 82 includes a pump flow rate limiting control unit 82a and a pump flow rate correction control unit 82b.

The pump flow rate limiting control unit 82a performs the limiting control for the maximum delivery flow rates of the hydraulic pumps 41a and 41b such that the output horsepower (absorption horsepower) of the hydraulic pumps 41a and 41b does not exceed the pump output power reference value Pow1 (explained later). The pump flow rate correction control unit 82b has a function of performing control such that the delivery flow rate of the hydraulic pump 41a or 41b gradually decreases when the hydraulic pump 41a or 41b remains in a predetermined high load operation state in which the hydraulic pump 41a or 41b is operated in a high pressure region and the high load operation state continues beyond a predetermined time. The pump flow rate limiting control unit 82a receives input values regarding maximum operation amounts Sa and Sb for actuator groups corresponding respectively to the hydraulic pumps 41a and 41b, delivery pressures Pa and Pb of the hydraulic pumps 41a and 41b, and the revolution speed target value N of the engine 22. Based on these values, the pump flow rate limiting control unit 82a calculates flow rate reference values Q3a and Q3b of the hydraulic pumps 41a and 41b to be used for performing the limiting control for the maximum delivery flow rates of the hydraulic pumps 41a and 41b as mentioned above. The pump flow rate correction control unit 82b calculates a first output power threshold value Powth1, a second output power threshold value Powth2 and the pump output power current value Pow0 of the hydraulic pumps 41a and 41b (explained later), corrects the flow rate reference values Q3a and Q3b by using these values, and calculates pump flow rate target values Q5a and Q5b to be used for the aforementioned control performed such that the delivery flow rate of the hydraulic pump 41a or 41b gradually decreases. The pump flow rate target values Q5a and Q5b are converted into the displacement command values for the hydraulic pumps 41a and 41b, and thereafter sent to the regulators 42a and 42b via the electric/hydraulic signal conversion devices 70a and 70b as regulator command values, by which the displacements of the hydraulic pumps 41a and 41b are controlled.

Figure 5:
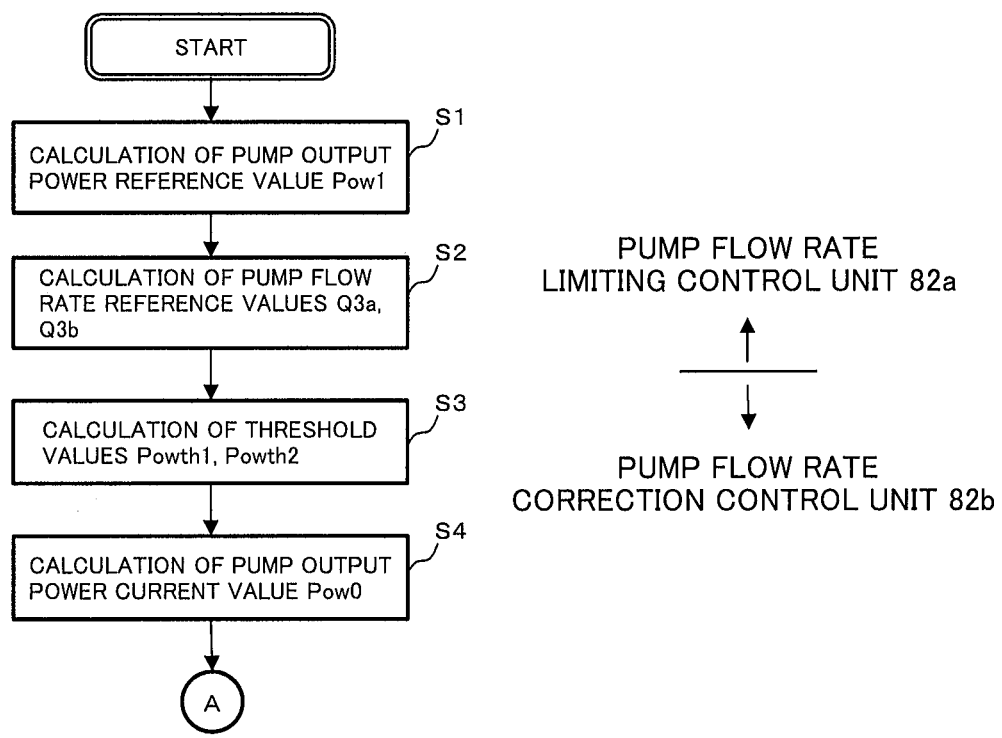
FIG. 5 is a schematic diagram showing a part of a flow chart of pump flow rate control performed by a pump flow rate control unit of the controller for calculating regulator command values.
Figure 6:
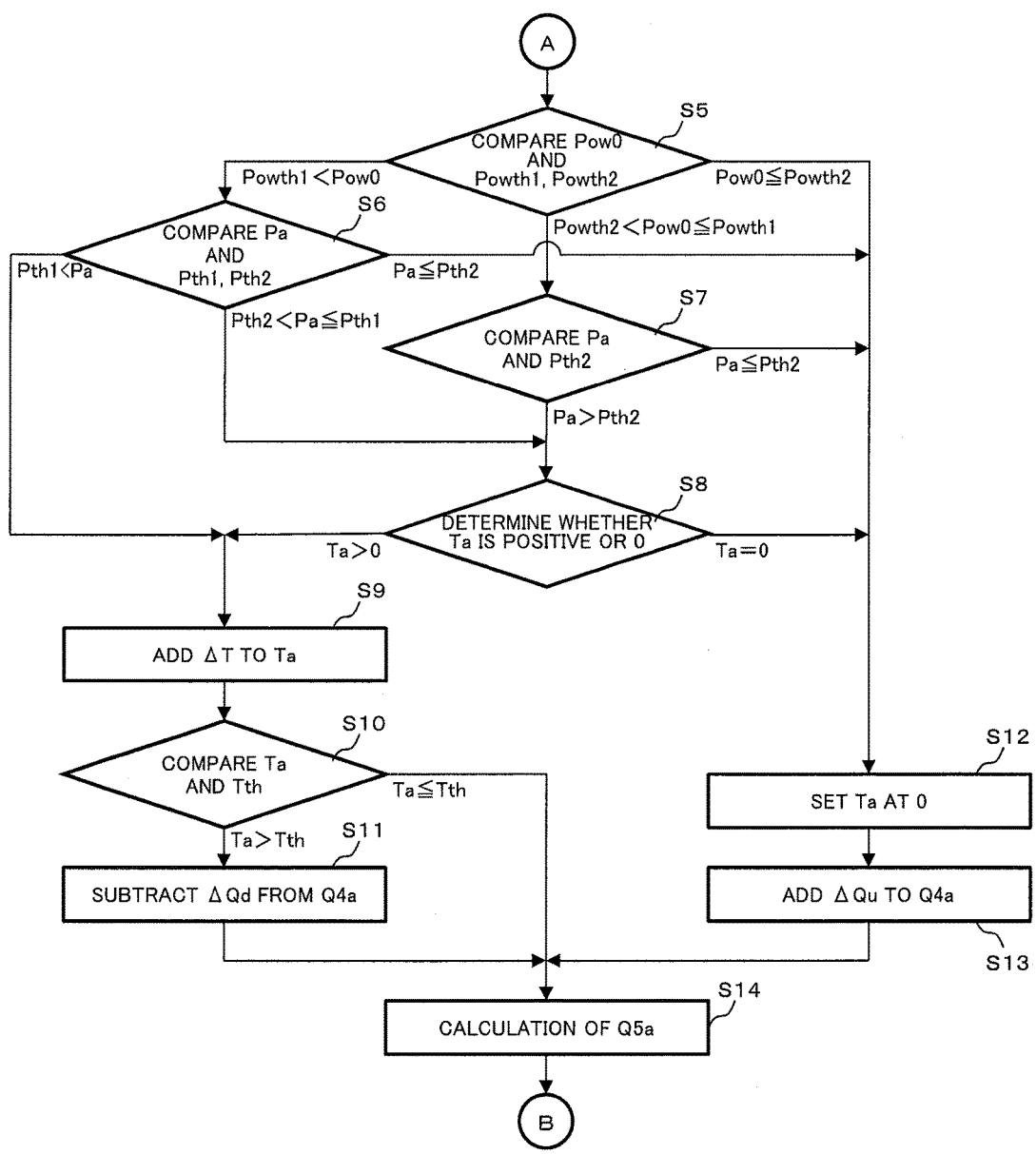
FIG. 6 is a schematic diagram showing a subsequent part of the flow chart shown in FIG. 5.
Figure 7:
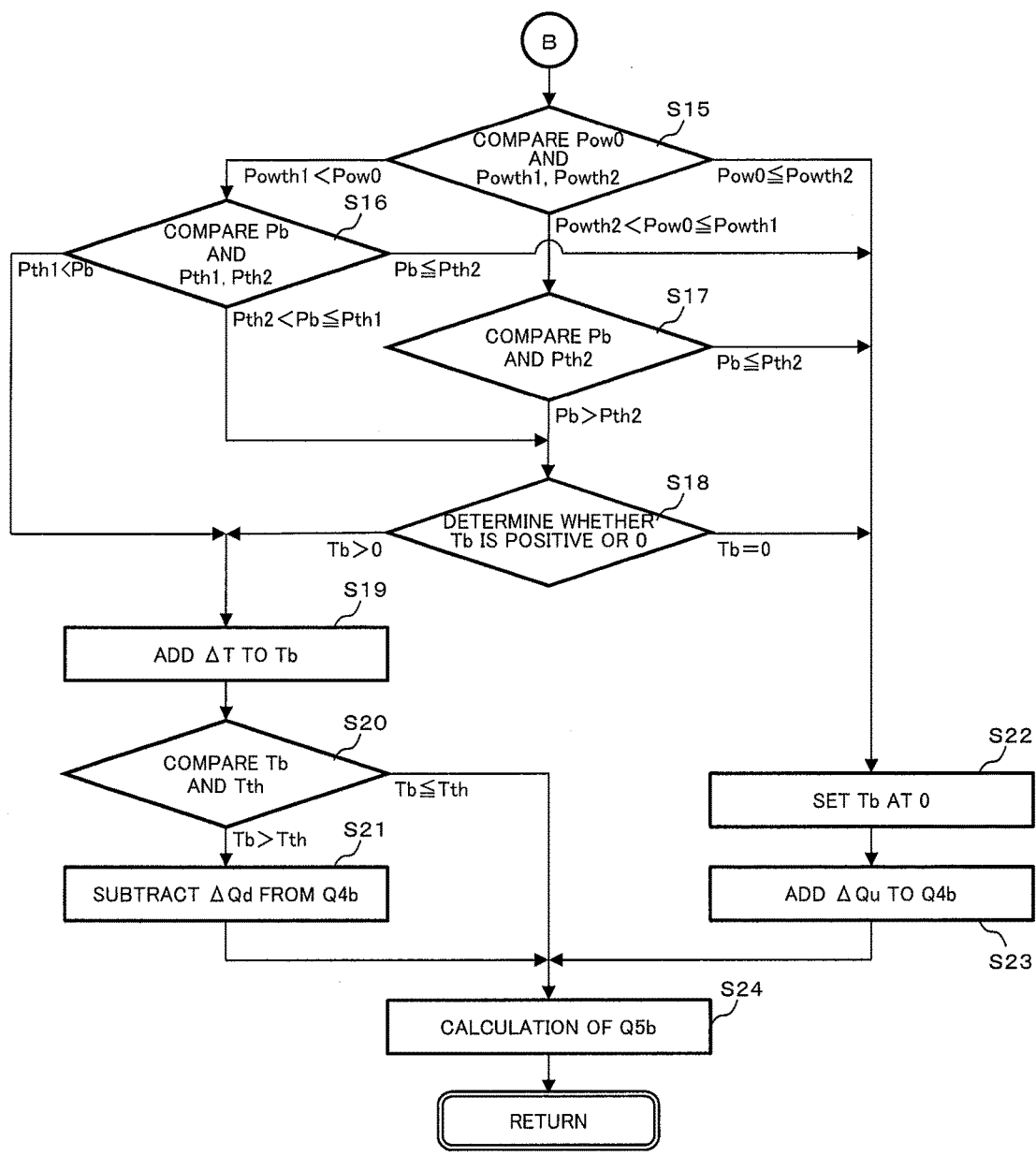
FIG. 7 is a schematic diagram showing a subsequent part of the flow chart shown in FIG. 6.
Figure 8:
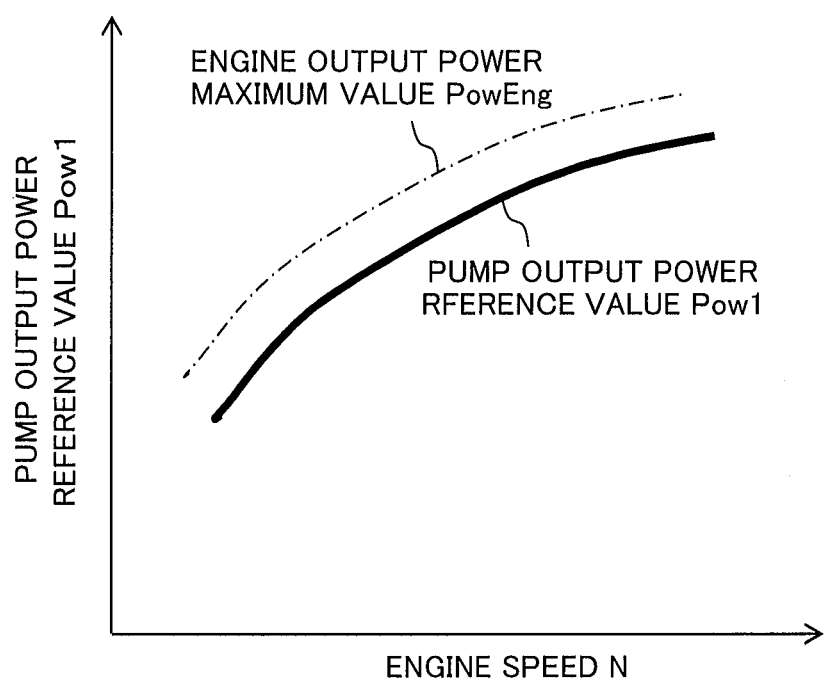
FIG. 8 is a schematic diagram showing an example of a table which is used in step S1 in FIG. 5 for determining a pump output power reference value.
Figure 9:
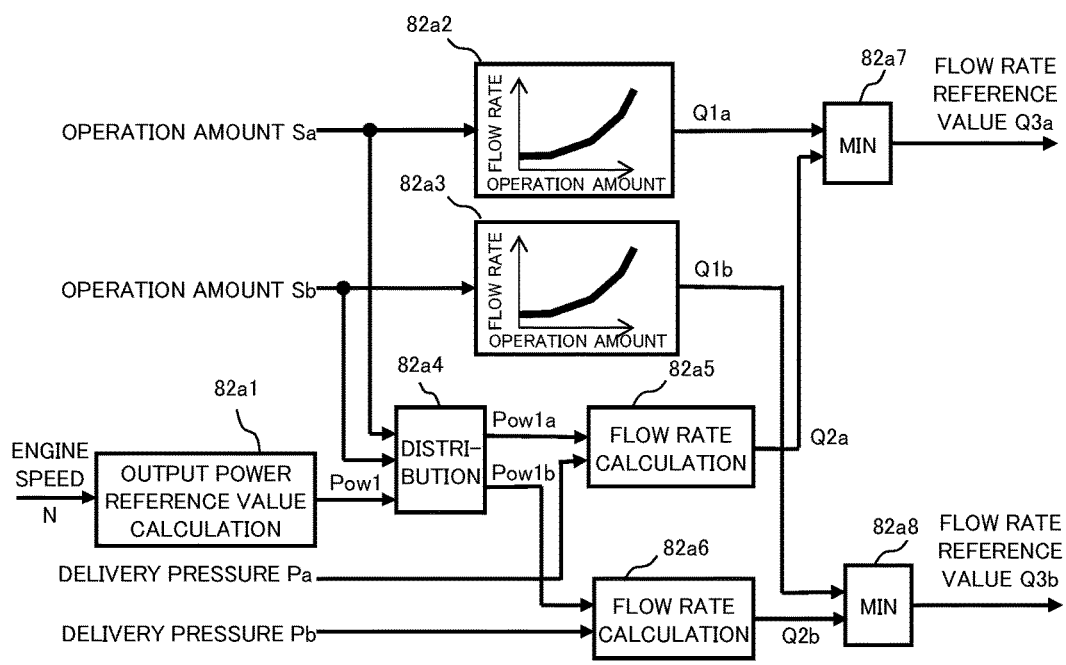
FIG. 9 is a block diagram showing functions of arithmetic processing parts (pump flow rate limiting control unit) corresponding to steps S1 and S2 in FIG. 5.

FIGS. 5-7 are schematic diagram showing a flow chart of the pump flow rate control performed by the pump flow rate control unit 82 (the pump flow rate limiting control unit 82a and the pump flow rate correction control unit 82b) of the controller 80 for calculating the regulator command values. FIG. 8 is a schematic diagram showing an example of a table which is used in step S1 in FIG. 5 for determining the pump output power reference value. FIG. 9 is a block diagram showing functions of arithmetic processing parts (pump flow rate limiting control unit 82a) corresponding to steps S1 and S2 in FIG. 5. In the flow chart of FIGS. 5-7, the steps S1 and S2 correspond to the pump flow rate limiting control unit 82a, while steps S3-S24 correspond to the pump flow rate correction control unit 82b. In this embodiment, an AND condition regarding the pump delivery pressure and the pump output power is used as the condition for reducing the pump flow rate.

Referring to FIG. 5, in the step S1, a pump output power reference value calculation unit 82a1 shown in FIG. 9 determines the pump output power reference value Pow1 (unit: kW) from the engine speed current value or the engine speed target value by using a preset table shown in FIG. 8. In the table shown in FIG. 8, the engine output power maximum value PowEng increases with the increase in the engine speed. Thus, the table of the pump output power reference value Pow1 is also set so as to increases accordingly with the increase in the engine speed. Incidentally, since the pump output power reference value Pow1 and the engine output power maximum value PowEng have a certain correlation as mentioned before, it is also possible to calculate the pump output power reference value Pow1 from the engine output power maximum value PowEng.

In the step S2, the flow rate reference values Q3a and Q3b (unit: L/min) of the hydraulic pumps 41a and 41b are determined from various types of operation signals Sa and Sb, the delivery pressures Pa and Pb (unit: MPa) of the pumps and the pump output power reference value Pow1.

The step S2 is executed as follows: First, required flow rate calculation units 82a2 and 82a3 shown in FIG. 9 determine required flow rates Q1a and Q1b (unit: L/min) from the maximum operation amount Sa selected from the operation amounts of control lever devices for commanding the operation of actuators connected to the hydraulic pump 41a (e.g., actuators for the boom, the arm, the bucket and the traveling) and the maximum operation amount Sb selected from the operation amounts of control lever devices for commanding the operation of actuators connected to the hydraulic pump 41b (e.g., actuators for the boom, the arm and the traveling) by using a preset table. In this table, the relationship between the operation amount Sa/Sb and the required flow rate Q1a/Q1b is set such that the required flow rate Q1a/Q1b increases with the increase in the operation amount Sa/Sb.

Subsequently, an output power distribution unit 82a4 distributes the pump output power reference value Pow1 into Pow1a and Pow1b (unit: kW) corresponding to the operation amounts Sa and Sb according to the following expressions:

$$Pow1a = Pow1 \times Sa/(Sa+Sb)$$

$$Pow1b = Pow1 \times Sb/(Sa+Sb)$$

Subsequently, flow rate calculation units 82a5 and 82a6 calculate limited flow rates Q2a and Q2b (unit: L/min) for horsepower control according to the following expressions:

$$Q2a = Pow1a/Pa \times 60$$

$$Q2b = Pow1b/Pb \times 60$$

Finally, minimum value selection units 82a7 and 82a8 set the lower one of the required flow rate Q1a and the limited flow rate Q2a as the flow rate reference value Q3a of the hydraulic pump 41a and set the lower one of the required flow rate Q1b and the limited flow rate Q2b as the flow rate reference value Q3b of the hydraulic pump 41b.

As above, the pump flow rate limiting control unit 82a constituted by the steps S1 and S2 in FIG. 5 or the blocks 82a1-82a8 in FIG. 9 performs the limiting control for the maximum delivery flow rates of the hydraulic pumps 41a and 41b such that the output horsepower of the hydraulic pumps 41a and 41b does not exceed the pump output power reference value Pow1.

Figure 10A:
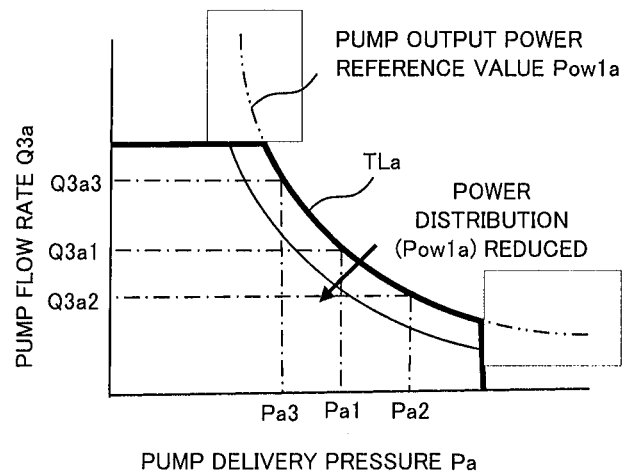
FIG. 10A is a schematic diagram showing the concept of control performed by a pump flow rate limiting control unit (P-Q characteristic of one of two hydraulic pumps).
Figure 10B:
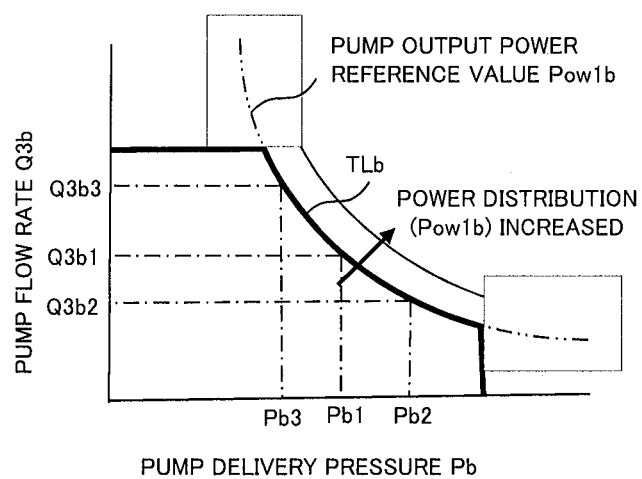
FIG. 10B is a schematic diagram showing the concept of the control performed by the pump flow rate limiting control unit (P-Q characteristic of the other one of the two hydraulic pumps).

FIGS. 10A and 10B are schematic diagrams showing the concept of the control performed by the pump flow rate limiting control unit 82a, wherein FIG. 10A shows the P-Q characteristic of the hydraulic pump 41a and FIG. 10B shows the P-Q characteristic of the hydraulic pump 41b. In FIG. 10A, the horizontal axis represents the delivery pressure Pa of the hydraulic pump 41a and the vertical axis represents the flow rate reference value Q3a set by the minimum value selection unit 82a7. In FIG. 10B, the horizontal axis represents the delivery pressure Pb of the hydraulic pump 41b and the vertical axis represents the flow rate reference value Q3b set by the minimum value selection unit 82a8. Each curve TLa/TLb in contact with the curve of the pump output power reference value Pow1a/Pow1b is the characteristic line of the horsepower control.

In FIG. 10A, when the delivery pressure of the hydraulic pump 41a increases and the output horsepower (absorption horsepower) of the hydraulic pump 41a is about to exceed the pump output power reference value Pow1a distributed to the hydraulic pump 41a, the limited flow rate Q2a for the horsepower control is selected by the minimum value selection unit 82a7 and the limited flow rate Q2a is set as the flow rate reference value Q3a. Consequently, when the delivery pressure of the hydraulic pump 41a is Pa1, for example, the flow rate reference value Q3a takes on the value Q3a1 on the characteristic line TLa of the horsepower control. When the delivery pressure of the hydraulic pump 41a rises to Pa2, the flow rate reference value Q3a decreases to Q3a2 on the characteristic line TLa of the horsepower control. When the delivery pressure of the hydraulic pump 41a drops to Pa3, the flow rate reference value Q3a increases to Q3a3 on the characteristic line TLa of the horsepower control. Meanwhile, the output horsepower (absorption horsepower) of the hydraulic pump 41a remains constant at Pow1a.

FIG. 10B also shows a similar concept of control. When the output horsepower of the hydraulic pump 41b is about to exceed the pump output power reference value Pow1b distributed to the hydraulic pump 41b, the limited flow rate Q2b for the horsepower control is set as the flow rate reference value Q3b. When the delivery pressure of the hydraulic pump 41b rises and drops from Pb1 to Pb2 and Pb3, the flow rate reference value Q3b changes from Q3b1 to Q3b2 and Q3b3 on the characteristic line TLb of the horsepower control. Meanwhile, the output horsepower of the hydraulic pump 41b remains constant at the pump output power reference value Pow1b distributed to the hydraulic pump 41b.

Consequently, the total output horsepower of the hydraulic pumps 41a and 41b is maintained constant at Pow1 (=Pow1a+Pow1b), the output horsepower of the hydraulic pumps 41a and 41b is controlled not to exceed Pow1, and the exertion of excessive loads on the engine 22 and the assist motor 23 is prevented.

Further, when there is a change in the operation amounts Sa and Sb, the output power distribution ratios of the output power distribution unit 82a4 change and the pump output power reference values Pow1a and Pow1b distributed to the hydraulic pumps 41a and 41b change accordingly, and thus the characteristic lines TLa and TLb of the horsepower control also change. For example, when the operation amount Sb increases, the pump output power reference value Pow1a distributed to the hydraulic pump 41a decreases and the characteristic line TLa of the horsepower control lowers as indicated by the arrow in FIG. 10A, while the pump output power reference value Pow1b distributed to the hydraulic pump 41b increases and the characteristic line TLb of the horsepower control rises as indicated by the arrow in FIG. 10B. However, also in this case, the total output horsepower of the hydraulic pumps 41a and 41b at the time when the delivery pressures Pa and Pb of the hydraulic pumps 41a and 41b change is maintained constant at Pow1 (=Pow1a+Pow1b), the output horsepower of the hydraulic pumps 41a and 41b is controlled not to exceed Pow1, and the exertion of excessive loads on the engine 22 and the assist motor 23 is prevented.

Figure 11:
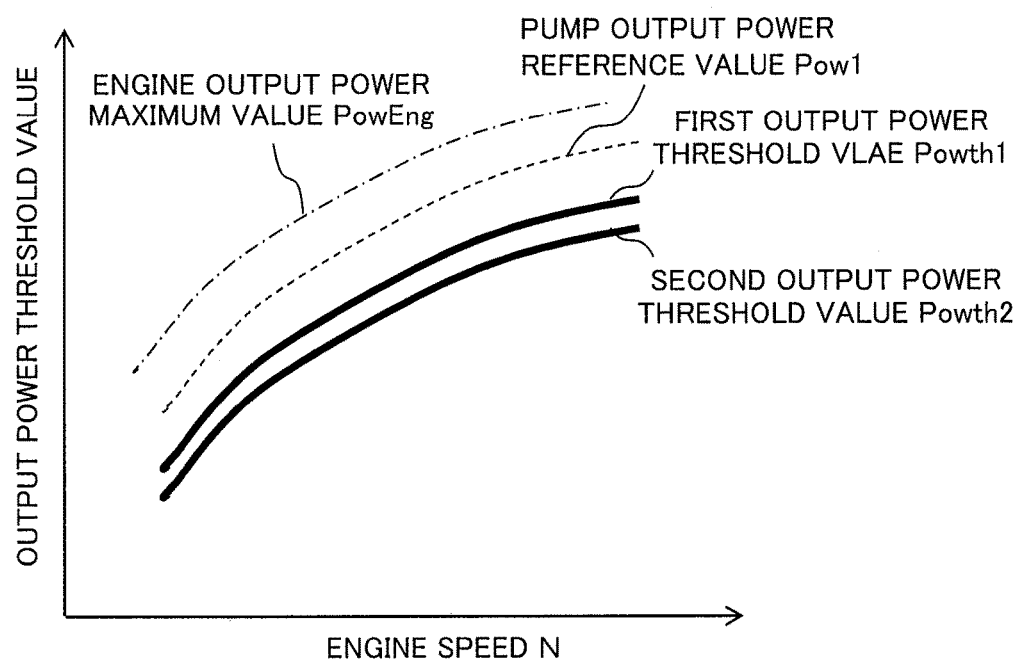
FIG. 11 is a schematic diagram showing an example of a table used for determining first and second output power threshold values in step S3 in FIG. 5.

Returning to FIG. 5, in step S3, the first output power threshold value Powth1 and the second output power threshold value Powth2 are determined from the engine speed current value or the engine speed target value by using a preset table. The first output power threshold value Powth1 is a threshold value that is used for judging whether or not the pump output power current value Pow0 (explained later) has increased to a level at which the driving of the assist motor 23 is necessary (whether or not the pump flow rate correction control according to the present invention has to be executed). The first output power threshold value Powth1 is set at a value smaller than or equal to the maximum value of the pump output power in cases where the pump is driven by the engine alone without driving the assist motor (i.e., the output horsepower (absorption horsepower) of the hydraulic pumps 41a and 41b when the output power of the engine 22 is at the aforementioned engine output power maximum value PowEng and the pump is driven by the engine alone without driving the assist motor). More specifically, the first output power threshold value Powth1 is set at a value equal to or slightly smaller than the maximum value of the pump output power. The second output power threshold value Powth2 is a threshold value that is used for judging whether or not the drive control of the assist motor 23 can be stopped without causing hunting when the pump output power current value Pow0 (explained later) has decreased below the first output power threshold value Powth1. FIG. 11 is a schematic diagram showing an example of the table used for determining the first and second output power threshold values in the step S3. In FIG. 11, the first output power threshold value Powth1 and the second output power threshold value Powth2 have been set at values smaller than the pump output power reference value Pow1. Further, the first output power threshold value Powth1 and the second output power threshold value Powth2 have been set so as to increase with the increase in the engine speed along with the pump output power reference value Pow1.

In step S4, the pump output power current value Pow0 (unit: kW) is calculated from the delivery pressures Pa and Pb of the pumps and the flow rates Q0a and Q0b of the pumps according to the following expression:

$$Pow0 = Pa \times Q0a/60 + Pb \times Q0b/60$$

The flow rate Q0a, Q0b of each pump may either be calculated from the displacement and the revolution speed of each pump or set at a value equal to the pump flow rate target value Q5a, Q5b of each pump which will be explained later. It is also possible to use values of Q5a and Q5b after applying a lowpass filter in consideration of the fact that the actual value has a response lag with respect to the target value.

Proceeding to FIG. 6, in step S5, the pump output power current value Pow0 is compared with the first output power threshold value Powth1 and the second output power threshold value Powth2. If Powth1<Pow0 holds, the process advances to step S6. If Powth2<Pow0≤Powth1 holds, the process advances to step S7. If Pow0≤Powth2 holds, the process advances to step S12.

In the step S6, the delivery pressure Pa of the hydraulic pump 41a is compared with a preset first pressure threshold value Pth1 and a preset second pressure threshold value Pth2. If Pth1<Pa holds, the process advances to step S9. If Pth2<Pa≤Pth1 holds, the process advances to step S8. If Pa≤Pth2 holds, the process advances to the step S12. The first pressure threshold value Pth1 is set in a high pressure range of the delivery pressure of the hydraulic pump 41a/41b, e.g., 30 MPa. The second pressure threshold value Pth2 is smaller than the first pressure threshold value Pth1, e.g., 25 MPa.

In the step S7, the delivery pressure Pa of the hydraulic pump 41a is compared with the second pressure threshold value Pth2. If Pa>Pth2 holds, the process advances to the step S8. If Pa≤Pth2 holds, the process advances to the step S12.

In the step S8, if a timer Ta (initial value: 0) is positive, the process advances to the step S9. If the timer Ta is 0, the process advances to the step S12.

In the step S9, a control cycle ΔT of the controller 80 (e.g., 10 msec) is added to the timer Ta.

In the next step S10, the timer Ta is compared with a timer threshold value Tth (e.g., 5 sec). If Ta>Tth holds, the process advances to step S11. If Ta≤Tth holds, the process advances to step S14.

In the step S11, a constant value ΔQd (e.g., 0.1 L/min) is subtracted from a flow rate correction value Q4a (initial value: 0) of the hydraulic pump 41a. However, when Q4a becomes lower than a preset lower limit (e.g., −70 L/min), Q4a is fixed at the lower limit. When the step S11 is finished, the process advances to the step S14.

In the step S12, the timer Ta is set at 0.

In the next step S13, a constant value ΔQu (e.g., 0.2 L/min) is added to the flow rate correction value Q4a of the hydraulic pump 41a. However, when Q4a becomes higher than Q4a is fixed at 0.

In the step S14, the flow rate target value Q5a of the hydraulic pump 41a is calculated according to the following expression:

$$Q5a=Q3a+Q4a$$

Then, a displacement target value of the hydraulic pump 41a is calculated by dividing Q5a by the revolution speed of the hydraulic pump 41a. The regulator 42a is controlled based on the displacement target value.

Proceeding to FIG. 7, in step S15, the pump output power current value Pow0 is compared with the first output power threshold value Powth1 and the second output power threshold value Powth2. If Powth1<Pow0 holds, the process advances to step S16. If Powth2<Pow0≤Powth1 holds, the process advances to step S17. If Pow0≤Powth2 holds, the process advances to step S22.

In the step S16, the delivery pressure Pb of the hydraulic pump 41b is compared with the first pressure threshold value Pth1 and the second pressure threshold value Pth2. If Pth1<Pb holds, the process advances to step S19. If Pth2<Pb≤Pth1 holds, the process advances to step S18. If Pb≤Pth2 holds, the process advances to the step S22.

In the step S17, the delivery pressure Pb of the hydraulic pump 41b is compared with the second pressure threshold value Pth2. If Pb>Pth2 holds, the process advances to the step S18. If Pb≤Pth2 holds, the process advances to the step S22.

In the step S18, if a timer Tb (initial value: 0) is positive, the process advances to the step S19. If the timer Tb is 0, the process advances to the step S22.

In the step S19, the control cycle ΔT of the controller 80 is added to the timer Tb.

In the next step S20, the timer Tb is compared with the timer threshold value Tth. If Tb>Tth holds, the process advances to step S21. If Tb≤Tth holds, the process advances to step S24.

In the step S21, the constant value ΔQd is subtracted from a flow rate correction value Q4b (initial value: 0) of the hydraulic pump 41b. However, when Q4b becomes lower than a preset lower limit, Q4b is fixed at the lower limit. When the step S21 is finished, the process advances to the step S24.

In the step S22, the timer Tb is set at 0.

In the next step S23, the constant value ΔQu is added to the flow rate correction value Q4b of the hydraulic pump 41b. However, when Q4b becomes higher than 0, Q4b is fixed at 0.

In the step S24, the flow rate target value Q5b of the hydraulic pump 41b is calculated according to the following expression:

$$Q5b=Q3b+Q4b$$

Then, a displacement target value of the hydraulic pump 41b is calculated by dividing Q5b by the revolution speed of the hydraulic pump 41b. The regulator 42b is controlled based on the displacement target value.

As above, the pump flow rate correction control unit 82b constituted by the steps S3-S24 performs control such that the delivery flow rate of the hydraulic pump 41a or 41b gradually decreases when the hydraulic pump 41a or 41b remains in the predetermined high load operation state, in which the delivery pressure of the hydraulic pump 41a or 41b is in the high pressure regions, and the high load operation state continues beyond a predetermined time.

Next, the operation of this embodiment will be described below.

(1) Light Load Work

In light load work such as leveling, the pump delivery pressures Pa and Pb are low and the pump output power current value Pow0 is small, and thus the hydraulic pumps 41a and 41b can be driven by the engine alone. The operation in this case is as follows:

First, since the pump delivery pressures Pa and Pb are low, the flow rate calculation units 82a5 and 82a6 shown in FIG. 9 calculate the limited flow rates Q2a and Q2b for the horsepower control as values larger than the required flow rates Q1a and Q1b (see FIGS. 10A and 10B) to satisfy the following relationships:

Q2a>Q1a
Q2b>Q1b

Thus, the pump flow rate reference values Q3a and Q3b are calculated in the step S2 as follows:

Q3a=Q1a
Q3b=Q1b

Further, since the pump output power current value Pow0 is small, the judgment in the step S5 is made as Pow0<Powth2 and the process advances to the steps S12, S13 and S14. In the step S14, the flow rate target value Q5a of the hydraulic pump 41a is calculated as follows:

$$Q5a=Q3a+Q4a=Q1a+0 \text{ (initial value)}=Q1a$$

Similarly, the judgment in the step S15 is made as Pow0≤Powth2 and the process advances to the steps S22, S23 and S24. In the step S24, the flow rate target value Q5b of the hydraulic pump 41b is calculated as follows:

$$Q5b=Q3b+Q4b=Q1b+0 \text{ (initial value)}=Q1b$$

Accordingly, the delivery flow rates of the hydraulic pumps 41a and 41b are controlled to achieve flow rates corresponding to the operation amounts Sa and Sb.

(2) Heavy Load Work A

In heavy load work such as heavy excavation work in which excavation and loading of earth and sand are performed frequently, at least one of the delivery pressures Pa and Pb of the hydraulic pumps 41a and 41b becomes high and the pump output power current value Pow0 becomes large, and thus the driving of the hydraulic pumps 41a and 41b by the engine alone becomes impossible. In such heavy load work, the operation when only the delivery pressure Pa of the hydraulic pump 41a is high is as follows:

First, since the delivery pressure Pa of the hydraulic pump 41a is high, the flow rate calculation unit 82a5 shown in FIG. 9 calculates the limited flow rate Q2a for the horsepower control as a value smaller than the required flow rate Q1a (see FIG. 10A). Meanwhile, since the delivery pressure Pb of the hydraulic pump 41b is not high, the flow rate calculation unit 82a6 shown in FIG. 9 calculates the limited flow rate Q2b for the horsepower control as a value larger than the required flow rate Q1b (see FIG. 10B). Accordingly, the following relationships are satisfied:

Q2a<Q1a
Q2b>Q1b

Thus, the pump flow rate reference values Q3a and Q3b are calculated in the step S2 as follows:

Q3a=Q2a
Q3b=Q1b

Since the delivery pressure Pa of the hydraulic pump 41a is high and the driving of the hydraulic pumps 41a and 41b by the engine alone is impossible, the judgments in the steps S5 and S6 are made as Pow0>Powth1
Pa>Pth1 and the process advances to the steps S5, S6, S9 and S10. Thereafter, when the state continues beyond the time of the timer threshold value Tth (5 sec), the process advances further to the steps S11 and S14. In the step S14, the flow rate target value Q5a of the hydraulic pump 41a is calculated as follows:

$$Q5a=Q3a+Q4a=Q2a+(0-\Delta Qd)$$

Thereafter, as the control cycle is repeated, the pump flow rate correction value Q4a decreases and the flow rate target value Q5a of the hydraulic pump 41a also decreases similarly. When the flow rate correction value Q4a reaches the lower limit (e.g., −70 L/min), the flow rate target value Q5a of the hydraulic pump 41a is also kept at a constant value obtained by subtracting the lower limit from the limited flow rate Q2a, for example.

Accordingly, the delivery flow rate of the hydraulic pump 41a is controlled to gradually decrease and when the flow rate reaches a value obtained by subtracting the lower limit of the flow rate correction value Q4a from the limited flow rate Q2a, for example, the delivery flow rate is kept at the value.

On the hydraulic pump 41b's side, Q2b>Q1b and Pb≤Pth2 hold. Therefore, the process advances to the step S22, S23 and S24 and the delivery flow rate of the hydraulic pump 41b is controlled to achieve a flow rate corresponding to the operation amount Sb similarly to the case of the light load work.

In the above-described period in which Pow0>Powth1 holds and the delivery flow rate of the hydraulic pump 41a gradually decreases, the assist motor 23 is driven and the insufficient horsepower of the engine 22 is supplemented (assisted) by the assist motor 23. In this case, with the decrease in the delivery flow rate of the hydraulic pump 41a, the output torque of the assist motor 23 also decreases and the amount of electric discharge from the electric storage device 24 decreases. When the delivery flow rate of the hydraulic pump 41a reaches the value obtained by subtracting the lower limit of the flow rate correction value Q4a, Pow0=Powth1 is satisfied, the assist motor 23 stops, and the amount of electric discharge from the electric storage device 24 reaches 0.

Thereafter, when the pump output power current value Pow0 has decreased to satisfy Pow0≤Powth2 or the delivery pressure Pa of the hydraulic pump 41a has decreased to satisfy Pa≤Pth2, the control for the hydraulic pump 41a's side switches to the steps S12, S13 and S14. In the step S12, the timer Ta is set at 0 (initialized). In the step S13, the constant value ΔQu (e.g., 0.2 L/min) is added to the flow rate correction value Q4a. As the control cycle is repeated, the pump flow rate correction value Q4a is increased and the flow rate target value Q5a of the hydraulic pump 41a also increases similarly in the step S14. Accordingly, the delivery flow rate of the hydraulic pump 41a is controlled to gradually increase (return to the original value).

(3) Heavy Load Work B

When only the delivery pressure Pb of the hydraulic pump 41b is high in heavy load work such as heavy excavation work, the relationship between the hydraulic pump 41a's side and the hydraulic pump 41b's side reverses from that in the case of the heavy load work A. As a result, the delivery flow rate of the hydraulic pump 41a is controlled to achieve a flow rate corresponding to the operation amount Sa, while the delivery flow rate of the hydraulic pump 41b is controlled to gradually decrease from the limited flow rate Q2b for the horsepower control, for example, after the elapse of a certain time. When the pump output power current value Pow0 has decreased to satisfy Pow0≤Powth2 or the delivery pressure Pb of the hydraulic pump 41b has decreased to satisfy Pb≤Pth2, the delivery flow rate of the hydraulic pump 41b is controlled to gradually increase (return to the original value).

(4) Heavy Load Work C

When both the pump delivery pressures Pa and Pb are high in heavy load work such as heavy excavation work, control similar to that on the hydraulic pump 41a's side in the case of the heavy load work A is performed both on the hydraulic pump 41a's side and on the hydraulic pump 41b's side. As a result, the delivery flow rates of the hydraulic pumps 41a and 41b are controlled to gradually decrease from the limited flow rates Q2a and Q2b for the horsepower control, for example, after the elapse of a certain time. When the pump output power current value Pow0 has decreased to satisfy Pow0≤Powth2 or the delivery pressure Pa or Pb of at least one of the hydraulic pumps 41a and 41b has decreased to satisfy Pa≤Pth2 or Pb≤Pth2, the delivery flow rate(s) of the at least one of the hydraulic pumps 41a and 41b is/are controlled to gradually increase (return to the original value(s)).

As described above, according to this embodiment, when the delivery pressure of the hydraulic pump 41a or 41b and the pump output power are high and the driving of the pumps by the engine alone is impossible, the pump flow rate is gradually decreased after the elapse of a certain time, by which the continuous electric discharge from the electric storage device 24 due to continuous operation at high load pressure can be suppressed without causing an unusual operational feeling for the operator.

Further, in this embodiment, two judgment condition: a judgment condition regarding the pump output power (steps S5 and S15) and a judgment condition regarding the pump delivery pressure (steps S6, S7, S16 and S17) are employed and the judgment on whether the delivery flow rate of the hydraulic pump 41a/41b has to be reduced or not is made by using both of the judgment conditions. Thus, the following effects are achieved:

In cases where only the condition regarding the pump delivery pressure is used (e.g., second embodiment), there is no judgment condition regarding the output power. Thus, when one of the pump delivery pressures is high but the total pump output power is low, there is a possibility that the operation speed is needlessly dropped by reducing the pump flow rate even when the driving of the pumps by the engine alone is possible and the continuous electric discharge from the electric storage device does not occur.

Further, in cases where only the condition regarding the pump output power is used (e.g., third embodiment), the flow rates of both pumps are reduced when one of the pump delivery pressures is high and the total pump output power is high. Thus, there is a possibility that the flow rates of actuators are needlessly reduced even if a relief valve on the low pump delivery pressure side has not relieved the pressure. When the relief valve has relieved the pressure, the actuators are not moving in most cases and the unusual operational feeling is slight even if the flow rate is dropped. However, when the relief valve has not relieved the pressure, the actuators are moving and thus the unusual operational feeling can arise if the flow rate is dropped.

In this embodiment, the judgment on whether the delivery flow rate of the hydraulic pump has to be reduced or not is made by using the AND condition of the judgment condition regarding the pump output power and the judgment condition regarding the pump delivery pressure. Therefore, appropriate pump flow rate control with excellent operability becomes possible without causing the above-described problems.

Second Embodiment

Figure 12:
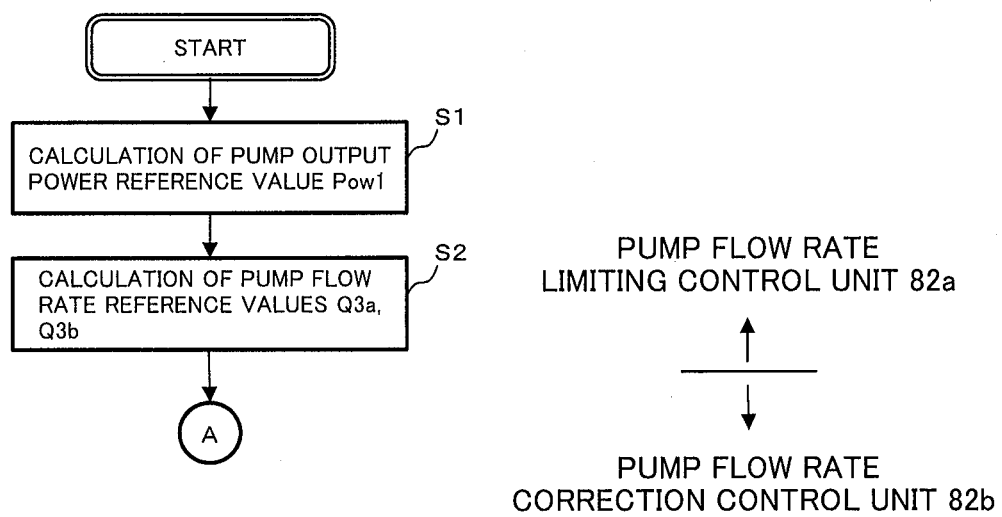
FIG. 12 is a schematic diagram showing a part of a flow chart of pump flow rate control performed for calculating the regulator command values by a pump flow rate control unit of a controller in a second embodiment of the hybrid work machine according to the present invention.
Figure 13:
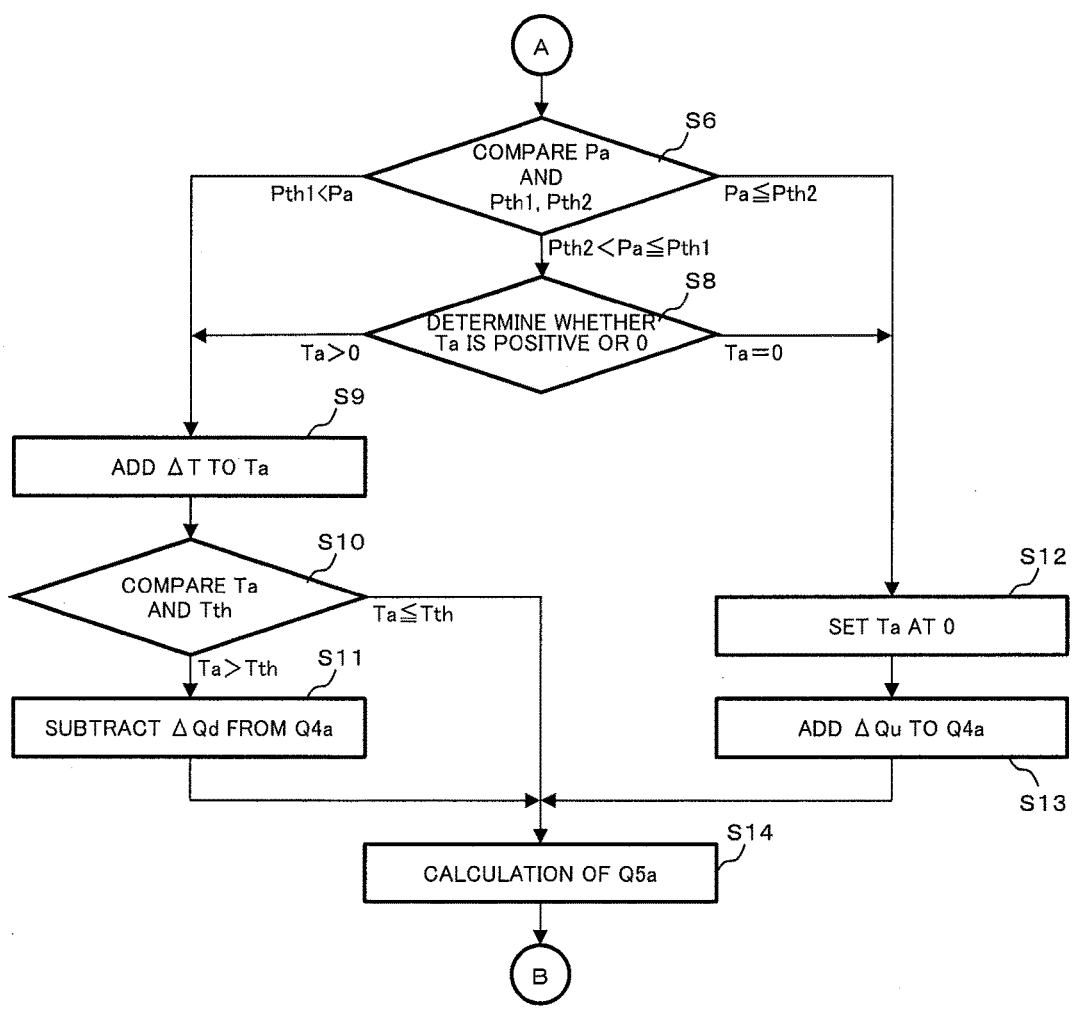
FIG. 13 is a schematic diagram showing a subsequent part of the flow chart shown in FIG. 12.
Figure 14:
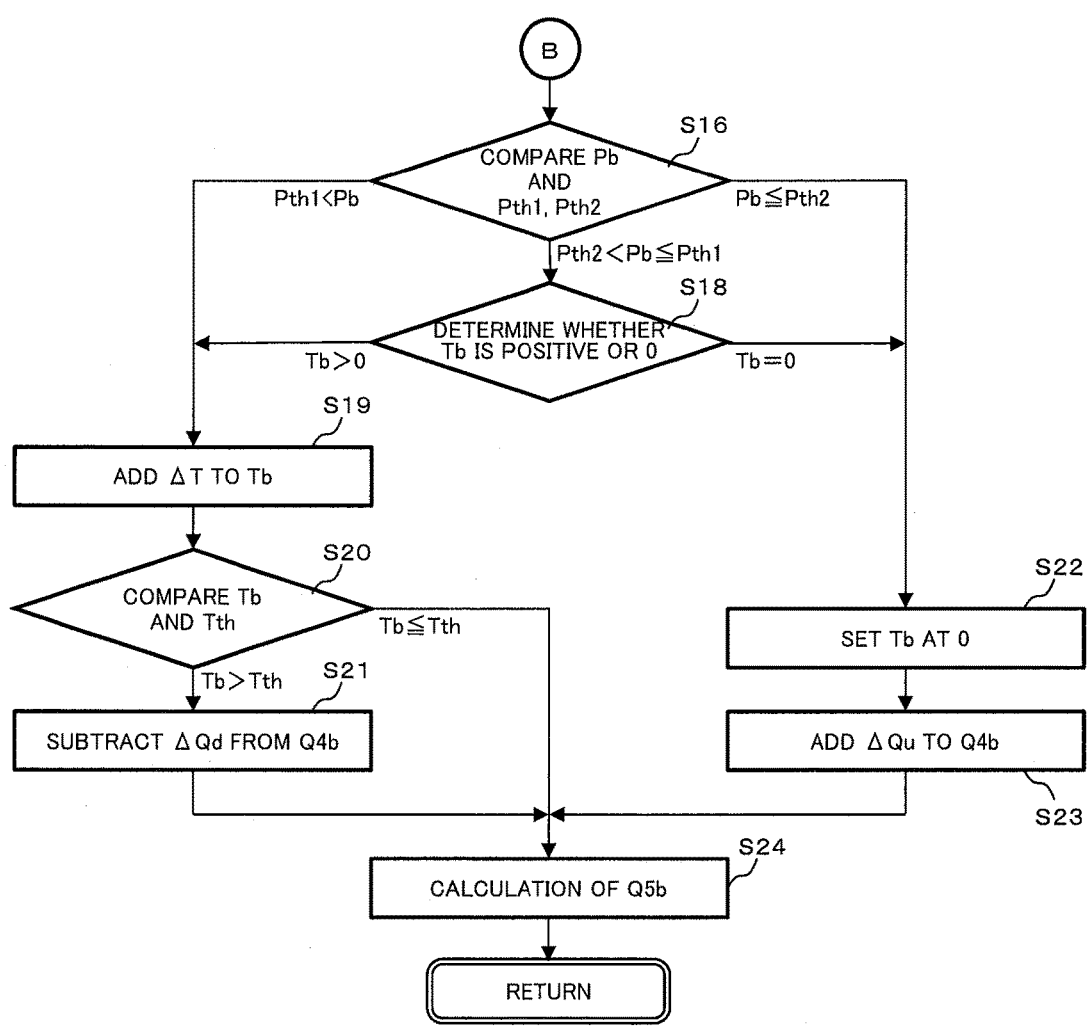
FIG. 14 is a schematic diagram showing a subsequent part of the flow chart shown in FIG. 13.

A second embodiment of the present invention will be described below. FIGS. 12-14 are schematic diagrams showing a flow chart of the pump flow rate control performed by a controller 80 in the second embodiment of the present invention for calculating the regulator command values. In this embodiment, only the condition regarding the pump delivery pressure is used as the condition for reducing the delivery flow rate of the hydraulic pump 41a or 41b. The flow chart of the pump flow rate control in the second embodiment is made by removing the judgment condition regarding the pump output power from the flow chart of the pump flow rate control in the first embodiment. The rest of the processing is equivalent to that in the first embodiment.

Also, with this embodiment, when the delivery pressure of the hydraulic pump 41a or 41b is high, the pump flow rate is gradually decreased after the elapse of a certain time, so that the continuous electric discharge from the electric storage device due to continuous operation at high load pressure can be suppressed without causing an unusual operational feeling for the operator.

Further, since the judgment condition regarding the pump output power is removed in this embodiment, when one of the pump delivery pressures is high but the total pump output power is low, there is a possibility that the operation speed is needlessly dropped by reducing the delivery flow rate of the hydraulic pump 41a or 41b even when the driving of the hydraulic pumps 41a and 41b by the engine alone is possible and the continuous electric discharge from the electric storage device 24 does not occur.

Nevertheless, the control can be simplified in the pump flow rate control in the second embodiment compared to the pump flow rate control in the first embodiment. Thus, the period necessary for the development and verification can be shortened.

Third Embodiment

Figure 15:
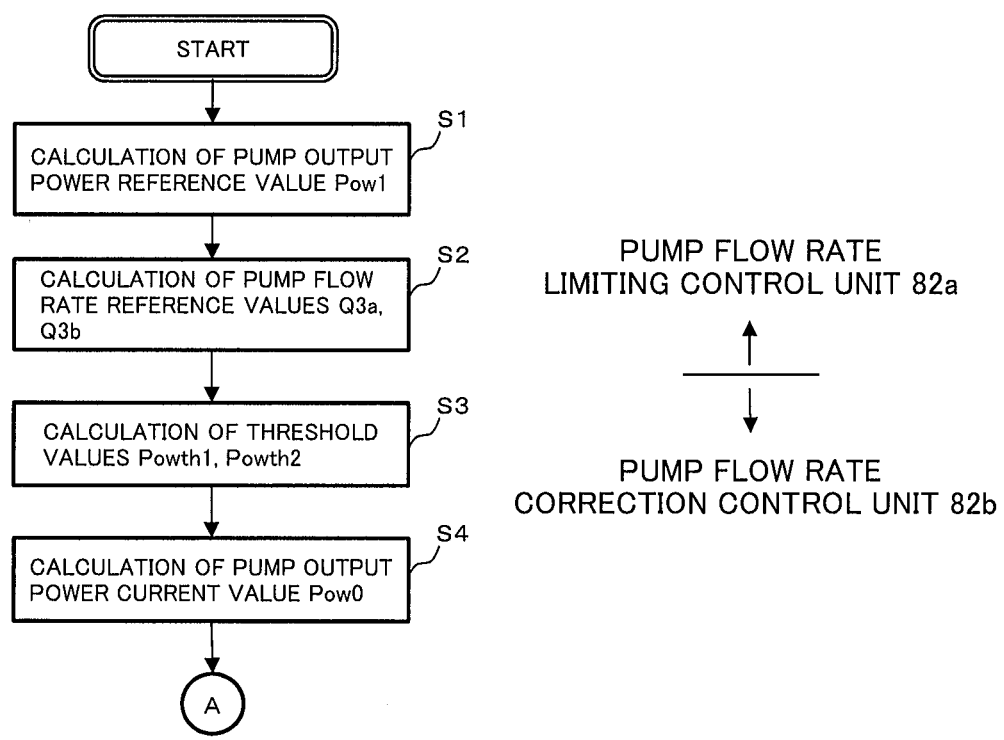
FIG. 15 is a schematic diagram showing a part of a flow chart of pump flow rate control performed for calculating the regulator command values by a pump flow rate control unit of a controller in a third embodiment of the hybrid work machine according to the present invention.
Figure 16:
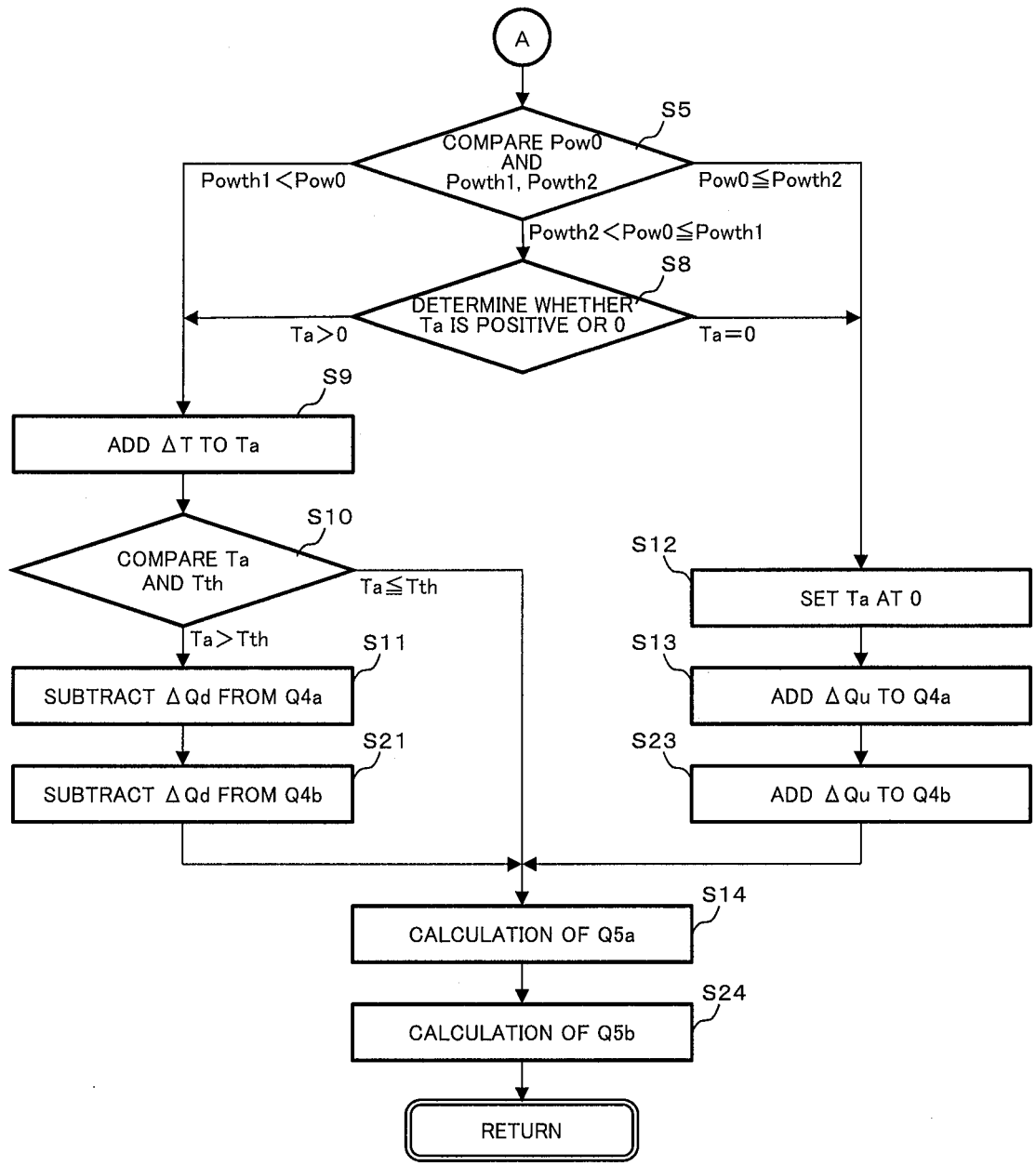
FIG. 16 is a schematic diagram showing a subsequent part of the flow chart shown in FIG. 15.

A third embodiment of the present invention will be described below. FIGS. 15 and 16 are schematic diagrams showing a flow chart of the pump flow rate control performed by a controller 80 in the third embodiment of the present invention for calculating the regulator command values. In this embodiment, only the condition regarding the pump output power is used as the condition for reducing the delivery flow rate of the hydraulic pump 41a or 41b. The flow chart of the pump flow rate control in the third embodiment is made by removing the judgment condition regarding the pump delivery pressure from the flow chart of the pump flow rate control in the first embodiment. The rest of the processing is equivalent to that in the first embodiment.

Also, with this embodiment, when the pump output power is high and the driving of the pumps by the engine alone is impossible, the pump flow rate is gradually decreased after the elapse of a certain time, so that the continuous electric discharge from the electric storage device due to continuous operation at high load pressure can be suppressed without causing an unusual operational feeling for the operator.

Further, when one of the pump delivery pressures is high and the total pump output power is high, though in the first embodiment the flow rate of a hydraulic pump on the high delivery pressure side is reduced, the delivery flow rates of both of the hydraulic pumps 41a and 41b are reduced in the third embodiment. Therefore, the operational feeling for the operator differs between the first embodiment and the third embodiment. Nevertheless, similarly to the second embodiment, the control can be simplified in the pump flow rate control in the third embodiment compared to the pump flow rate control in the first embodiment, and thus the period necessary for the development and verification can be shortened.

OTHER EXAMPLES

While the above description of the embodiments has been given of cases where the hybrid work machine includes two main pumps of the hydraulic pumps 41a and 41b, the number of the hydraulic pumps may also be one, or three or more. When the hybrid work machine includes one hydraulic pump, the condition regarding the pump output power may be used alone as the condition for reducing the delivery flow rate of the hydraulic pump similarly to the third embodiment.

Further, while a hydraulic excavator has been taken as an example of the hybrid work machine in the above embodiments, the present invention is applicable also to work machines other than hydraulic excavators, such as hydraulic cranes.

What is claimed is:
1. A hybrid work machine comprising:
an engine;
an assist motor that is mechanically connected to the engine, performs electric discharge by generating a drive torque and generates electric power by generating a braking torque;

a plurality of hydraulic pumps driven by a total torque of the engine and the assist motor;

a plurality of actuators driven by hydraulic fluid delivered from the hydraulic pumps;

a plurality of control lever devices for commanding the operation of said plurality of actuators;

an electric storage device that accumulates the electric power generated by the assist motor and supplies the electric power when the assist motor performs electric discharge; and a pump flow rate control device that receives input signals of operation amounts of the control lever devices, delivery pressure of the hydraulic pumps, and revolution speed of the engine for controlling delivery flow rates of the hydraulic pumps based on flow rate target values determined from a flow rate reference value and a flow rate correction value;

wherein the pump flow rate control device includes:

a pump flow limiting control unit configured to: determine respective flow rate reference values for performing limiting control of maximum delivery flow rates of the hydraulic pumps based on the operation amounts of the control lever devices, the delivery pressures of the hydraulic pumps and a pump output power reference value determined by the revolution speed of the engine and control the delivery flow rates of the hydraulic pumps based on the flow rate reference values, to thereby perform the limiting control for the maximum delivery flow rates of the hydraulic pumps such that a total pump output horsepower, that is a sum of output horsepower values of the hydraulic pumps, does not exceed the pump output power reference value, and a pump flow rate correction control unit configured to continuously determine whether the respective delivery pressures of the hydraulic pumps are greater than a first pressure threshold value, and upon determining a first delivery pressure of a first hydraulic pump is greater than the first pressure threshold value and the first delivery pressure is greater than the first pressure threshold value for a predetermined amount of time, subtract a flow rate correction value by a first constant value of the first hydraulic pump and combine the flow rate correction value and the flow rate reference value to correct a flow rate target value to thereby decrease the delivery flow rate of the first hydraulic pump.

2. The hybrid work machine according to claim 1, wherein:

the pump flow rate correction control unit is configured to stop subtracting the flow rate correction value by the first constant value thereby stopping the decrease of the delivery flow rate of the first hydraulic pump upon determining the first delivery pressure of the first hydraulic pump is less than or equal to second output power threshold value that is less than the first pressure threshold value.

3. The hybrid work machine according to claim 1, wherein the pump flow rate correction control unit is configured to, upon determining that a second delivery pressure of a second hydraulic pump is less than the first pressure threshold value and less than a second pressure threshold value or upon determining that the second delivery pressure of the hydraulic pumps is less than or equal to the first pressure threshold value and greater than the second pressure threshold value and a time value is zero, increase the flow rate correction value by a second constant value and combine the flow rate correctoin value and the flow rate reference value thereby correcting the flow rate target value and increasing the delivery flow rate of the second hydraulic pump.

* * * * *